United States Patent
Yoo et al.

(10) Patent No.: US 9,100,843 B2
(45) Date of Patent: Aug. 4, 2015

(54) PER-CELL TIMING AND/OR FREQUENCY ACQUISITION AND THEIR USE ON CHANNEL ESTIMATION IN WIRELESS NETWORKS

(71) Applicant: QUALCOMM Incorporated, San Diego, CA (US)

(72) Inventors: Taesang Yoo, San Diego, CA (US); Tao Luo, San Diego, CA (US); Xiaoxia Zhang, San Diego, CA (US); Ke Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 13/865,693

(22) Filed: Apr. 18, 2013

(65) Prior Publication Data

US 2013/0231123 A1    Sep. 5, 2013

Related U.S. Application Data

(62) Division of application No. 12/949,020, filed on Nov. 18, 2010.

(60) Provisional application No. 61/262,911, filed on Nov. 19, 2009.

(51) Int. Cl.
*H04Q 9/00* (2006.01)
*H04W 24/00* (2009.01)
*H04W 56/00* (2009.01)

(52) U.S. Cl.
CPC .............. *H04W 24/00* (2013.01); *H04W 56/00* (2013.01)

(58) Field of Classification Search
CPC ........................... H04W 40/00; H04W 72/005
USPC ................................ 370/330, 350; 455/452.1
See application file for complete search history.

(56) References Cited

U.S. PATENT DOCUMENTS 5,555,257 A   9/1996   Dent
6,847,630 B2  1/2005   Blanz et al.
(Continued)

FOREIGN PATENT DOCUMENTS

CN   1300170 A   6/2001
CN   1497993 A   5/2004
(Continued)

OTHER PUBLICATIONS

3rd Generation Partnership Project, Technical Specification Group Radio Access Network, Further Advancements for E-UTRA Physical Layer Aspects (Release 9 ), 3GPP Standard, 3GPP TR 36.814, 3rd Generation Partnership Project (3GPP), Mobile Competence Centre , 650, Route Des Lucioles , F-06921 Sophia-Antipolis Cedex , France, No. V0.4.1, Feb. 1, 2009, pp. 1-31, XP050380817.
(Continued)

*Primary Examiner* — Wanda Z Russell
(74) *Attorney, Agent, or Firm* — Nerrie M. Zohn

(57) ABSTRACT

A method, an apparatus, and a computer program product for wireless communication are provided in which a system timing is estimated, derived from timing of one or more cells, a timing offset is determined for a plurality of cells relative to the estimated system timing, and signals received form the plurality of cells are processed using the timing offsets. In addition, a method, an apparatus, and a computer program product for wireless communication are provided in which a carrier frequency is estimated, derived from a frequency of one or more cells, a frequency offset is determined for a plurality of cells relative to the estimated system timing, and signals received form the plurality of cells are processed using the frequency offsets.

22 Claims, 11 Drawing Sheets

(56) References Cited

U.S. PATENT DOCUMENTS

| | | | |
|---|---|---|---|
| 7,450,907 B2 | 11/2008 | Shurvinton et al. | |
| 7,463,576 B2 | 12/2008 | Krishnan et al. | |
| 7,801,091 B2 | 9/2010 | Chillariga et al. | |
| 8,023,955 B2 | 9/2011 | Anderson et al. | |
| 8,072,918 B2 | 12/2011 | Muharemovic et al. | |
| 2002/0187786 A1 | 12/2002 | Takano et al. | |
| 2003/0007471 A1 | 1/2003 | Terasawa et al. | |
| 2003/0119451 A1 | 6/2003 | Jang et al. | |
| 2004/0072566 A1 | 4/2004 | Kuwahara et al. | |
| 2004/0072572 A1 | 4/2004 | Nakamura et al. | |
| 2004/0110518 A1 | 6/2004 | Swift et al. | |
| 2004/0131029 A1 | 7/2004 | Tobe et al. | |
| 2005/0111408 A1 | 5/2005 | Skillermark et al. | |
| 2005/0111526 A1 | 5/2005 | Bilgic et al. | |
| 2005/0255819 A1 | 11/2005 | Kawamoto et al. | |
| 2005/0276315 A1 | 12/2005 | Shimizu et al. | |
| 2005/0282547 A1 | 12/2005 | Kim et al. | |
| 2006/0063556 A1 | 3/2006 | Palenius et al. | |
| 2006/0072500 A1 | 4/2006 | Kent et al. | |
| 2006/0153147 A1 | 7/2006 | Chillariga et al. | |
| 2007/0049275 A1 | 3/2007 | Simeon | |
| 2007/0054681 A1 | 3/2007 | Suh et al. | |
| 2007/0140203 A1* | 6/2007 | Qiao | 370/342 |
| 2007/0149227 A1 | 6/2007 | Parizhsky et al. | |
| 2007/0149238 A1 | 6/2007 | Das et al. | |
| 2007/0159969 A1 | 7/2007 | Das et al. | |
| 2007/0230590 A1 | 10/2007 | Choi et al. | |
| 2007/0243878 A1 | 10/2007 | Taira et al. | |
| 2008/0130790 A1 | 6/2008 | Forenza et al. | |
| 2008/0212515 A1 | 9/2008 | Yomo et al. | |
| 2008/0232513 A1* | 9/2008 | Wang et al. | 375/340 |
| 2009/0016321 A1 | 1/2009 | Li et al. | |
| 2009/0034482 A1 | 2/2009 | Hahm et al. | |
| 2009/0046671 A1 | 2/2009 | Luo | |
| 2009/0098830 A1 | 4/2009 | Simmons et al. | |
| 2009/0109919 A1 | 4/2009 | Bertrand et al. | |
| 2009/0116473 A1* | 5/2009 | Lindoff et al. | 370/350 |
| 2009/0131009 A1 | 5/2009 | Hepler et al. | |
| 2009/0143016 A1 | 6/2009 | Li | |
| 2009/0149169 A1 | 6/2009 | Tanno et al. | |
| 2009/0215480 A1 | 8/2009 | Kim et al. | |
| 2009/0225743 A1 | 9/2009 | Nicholls et al. | |
| 2009/0279420 A1 | 11/2009 | Koyanagi | |
| 2010/0008317 A1 | 1/2010 | Bhattad et al. | |
| 2010/0039948 A1 | 2/2010 | Agrawal et al. | |
| 2010/0080323 A1 | 4/2010 | Mueck et al. | |
| 2010/0137013 A1 | 6/2010 | Ren | |
| 2010/0238906 A1 | 9/2010 | Komatsu | |
| 2010/0285792 A1* | 11/2010 | Chen et al. | 455/422.1 |
| 2010/0317343 A1 | 12/2010 | Krishnamurthy et al. | |
| 2011/0007717 A1 | 1/2011 | Swarts et al. | |
| 2011/0092231 A1 | 4/2011 | Yoo et al. | |
| 2011/0098054 A1* | 4/2011 | Gorokhov et al. | 455/452.1 |
| 2011/0228837 A1 | 9/2011 | Nentwig | |
| 2011/0261909 A1 | 10/2011 | Andgart et al. | |
| 2011/0286376 A1 | 11/2011 | Yoo et al. | |
| 2012/0051287 A1 | 3/2012 | Merlin et al. | |
| 2012/0076040 A1 | 3/2012 | Hoshino et al. | |
| 2013/0033998 A1 | 2/2013 | Seo et al. | |
| 2013/0201950 A1 | 8/2013 | Wang et al. | |
| 2013/0308466 A1 | 11/2013 | Yoo et al. | |
| 2014/0135025 A1 | 5/2014 | Yoo et al. | |

FOREIGN PATENT DOCUMENTS

| | | |
|---|---|---|
| CN | 1604500 A | 4/2005 |
| CN | 1697336 A | 11/2005 |
| CN | 1905730 A | 1/2007 |
| CN | 1906862 A | 1/2007 |
| CN | 101164364 A | 4/2008 |
| CN | 100433673 C | 11/2008 |
| EP | 1107483 A1 | 6/2001 |
| EP | 1564903 A2 | 8/2005 |
| EP | 1887823 A1 | 2/2008 |
| EP | 1906686 A1 | 4/2008 |
| EP | 2079121 A1 | 7/2009 |
| EP | 2079212 A1 | 7/2009 |
| JP | H0946762 A | 2/1997 |
| JP | 2001237769 A | 8/2001 |
| JP | 2003234671 A | 8/2003 |
| JP | 2003309491 A | 10/2003 |
| JP | 2004120586 A | 4/2004 |
| JP | 2004135210 A | 4/2004 |
| JP | 2005521197 A | 7/2005 |
| JP | 2005354459 A | 12/2005 |
| JP | 2006140631 A | 6/2006 |
| JP | 2006287663 A | 10/2006 |
| JP | 2009239568 A | 10/2009 |
| JP | 2010518669 A | 5/2010 |
| JP | 2010532592 A | 10/2010 |
| KR | 20060047838 A | 5/2006 |
| KR | 20070120988 A | 12/2007 |
| WO | 03005610 | 1/2003 |
| WO | WO-03081931 A1 | 10/2003 |
| WO | WO-2008093101 A2 | 8/2008 |
| WO | 2008118514 A2 | 10/2008 |
| WO | WO-2009059986 A2 | 5/2009 |

OTHER PUBLICATIONS

"Efficient UE Signaling in Support of DL CoMP," 3GPP TSG Ran WG1 Meeting # 58, Shenzhen, China, Aug. 24-28, 2009, pp. 1-4.

European Search Report—EP12197946—Search Authority—The Hague—Jan. 23, 2014.

Taiwan Search Report—TW099140041—TIPO—Mar. 19, 2014.

Garcia L G U, et al., "Autonomous component carrier selection: interference management in local area environments for LTE-advanced", IEEE Communications Magazine, IEEE Service Center, Piscataway, US, vol. 47, No. 9, Sep. 1, 2009, pp. 110-116, XP011283372, ISSN: 0163-6804, DOI: DOI:10.1109/MCOM.2009.5277463.

International Search Report and Written Opinion—PCT/US2010/057513, ISA/EPO—Jun. 27, 2011.

Zhuang A et al., "Comparison-of decision-directed and pilot-aided algorithms for complex channel tap estimation in a downlink WCDMA system", Personal, Indoor and Mobile Radio Communications, 2000, PIMRC 2000, TH E 11th IEEE International Symposium on Sep. 18-21, 2000, Piscataway, NJ, USA, IEEE, vol. 2, Sep. 18, 2000, pp. 1121-1125, XP010520807, ISBN: 978-0-7803-6463-9.

European Search Report—EP13181319—Search Authority—The Hague—Sep. 30, 2013.

TD Tech., et al., "Text proposal to 25.866 on synchronization schemes for 1.28Mcps TDD Home Node B", 3GPP DRAFT; R3-092133, 3rd Generation Partnership Project (3GPP), Mobile Competence Centre ; 650, Route Des Lucioles ; F-06921 Sophia-Antipolis Cedex ; France, no. Shenzhen, China; Aug. 24, 2009, XP050391662.

* cited by examiner

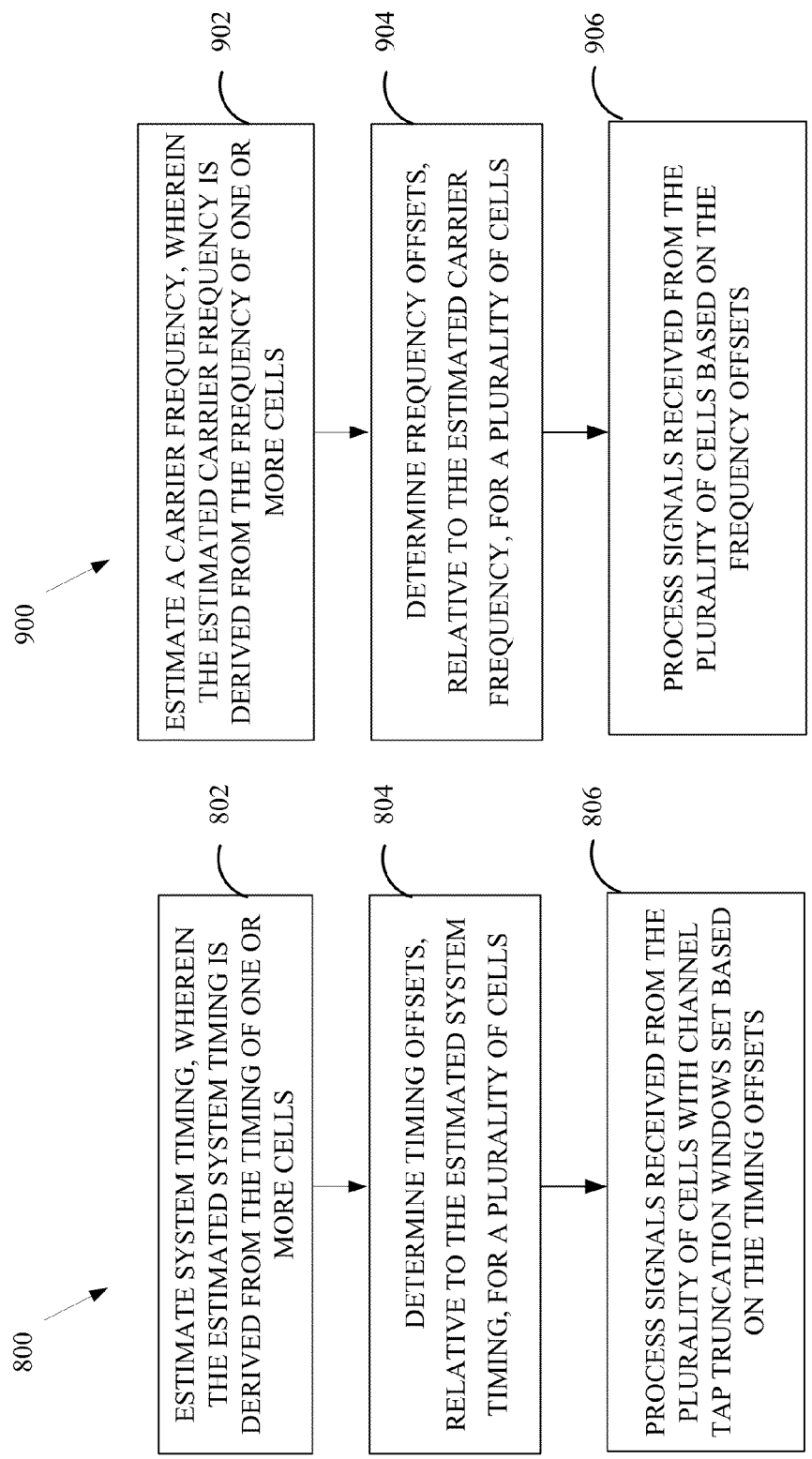

PER-CELL TIMING AND/OR FREQUENCY ACQUISITION AND THEIR USE ON CHANNEL ESTIMATION IN WIRELESS NETWORKS

CLAIM OF PRIORITY UNDER 35 U.S.C. §119 AND §120

The present application for patent is a Divisional application of U.S. Ser. No. 12/949,020; filed Nov. 18, 2010, entitled "PER-CELL TIMING AND/OR FREQUENCY ACQUISITION AND THEIR USE ON CHANNEL ESTIMATION IN WIRELESS NETWORKS" which claims priority to U.S. Provisional Application No. 61/262,911, entitled, "PER-CELL TIMING AND/OR FREQUENCY ACQUISITION AND THEIR USE ON CHANNEL ESTIMATION IN WIRELESS NETWORKS," filed Nov. 19, 2009, and assigned to the assignee hereof and expressly incorporated herein by reference.

FIELD

The present disclosure relates generally to communication systems, and more particularly, to utilizing per-cell timing acquisition, per-cell frequency acquisition, or a combination thereof, for channel estimation in wireless networks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In some scenarios, a UE may need to connect to a weak cell instead of the strongest nearby cell. For example this may occur during range expansion or where the strongest cell may be a closed subscriber group (CSG) cell. In such scenarios, it may be beneficial for the UE to track the timing, carrier frequency, or both of the stronger cell instead of the weaker serving cells. As a UE tracks a single timing (be it a serving cell's timing, a strong interferer's timing, or a composite timing), there naturally exists a gap between the timing the UE is tracking and the timing of each cell the UE wants to monitor.

In aspects of the disclosure, methods, apparatuses, and a computer program products for wireless communication are provided, generally involving estimating system timing, wherein the estimated system timing is derived from the timing of one or more cells, determining timing offsets, relative to the estimated system timing, for a plurality of cells, and processing signals received from the plurality of cells with channel tap truncation windows set based on the timing offsets.

In aspects of the disclosure, methods, apparatuses, and a computer program products for wireless communication are provided, generally involving estimating a carrier frequency, wherein the estimated frequency is derived from the frequency of one or more cells, determining frequency offsets, relative to the estimated carrier frequency, for a plurality of the cells, and processing signals received from the plurality of cells based on one or more of the frequency offsets.

BRIEF DESCRIPTION OF THE DRAWINGS

FIG. 8 is a flow chart of a method of wireless communication.

FIG. 9 is another flow chart of a method of wireless communication.

DETAILED DESCRIPTION

Figure 1:
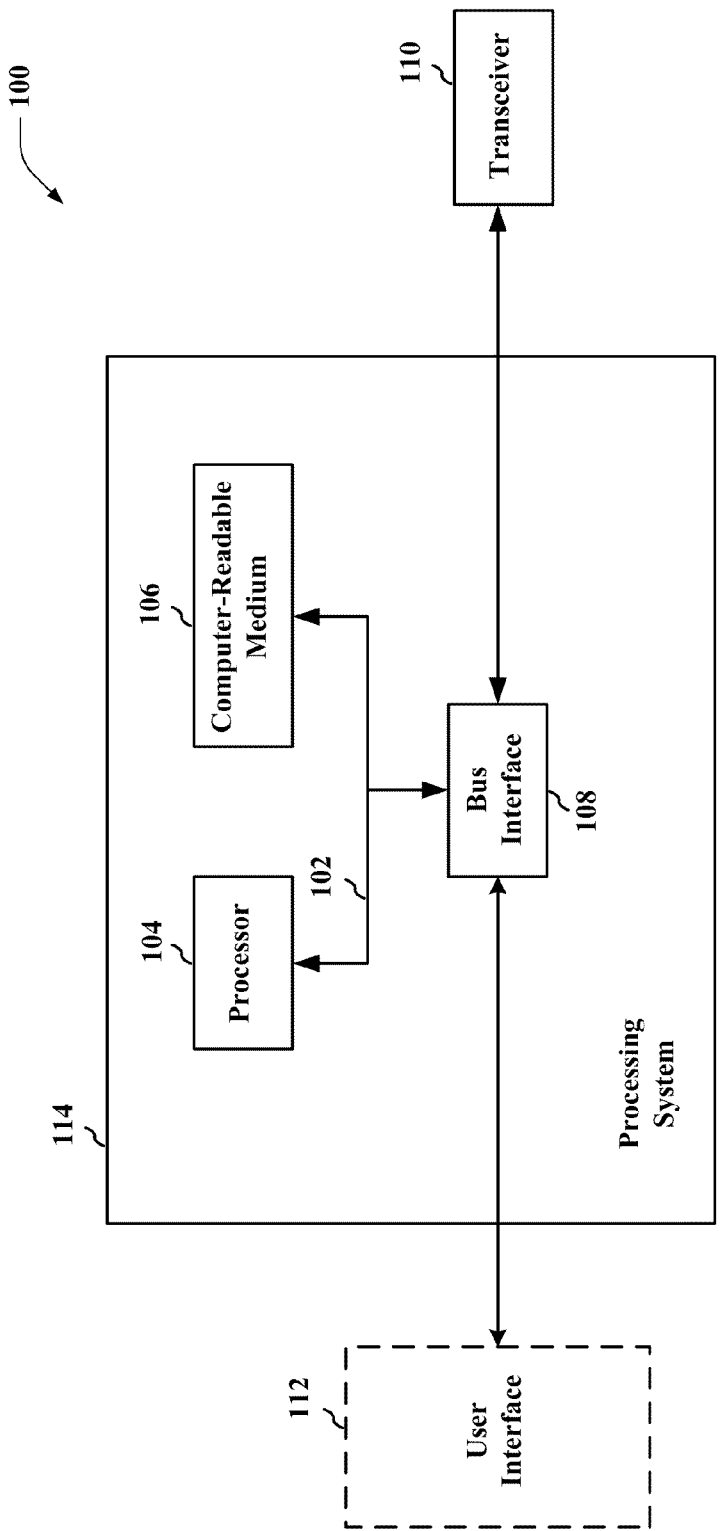
FIG. 1 is a conceptual diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
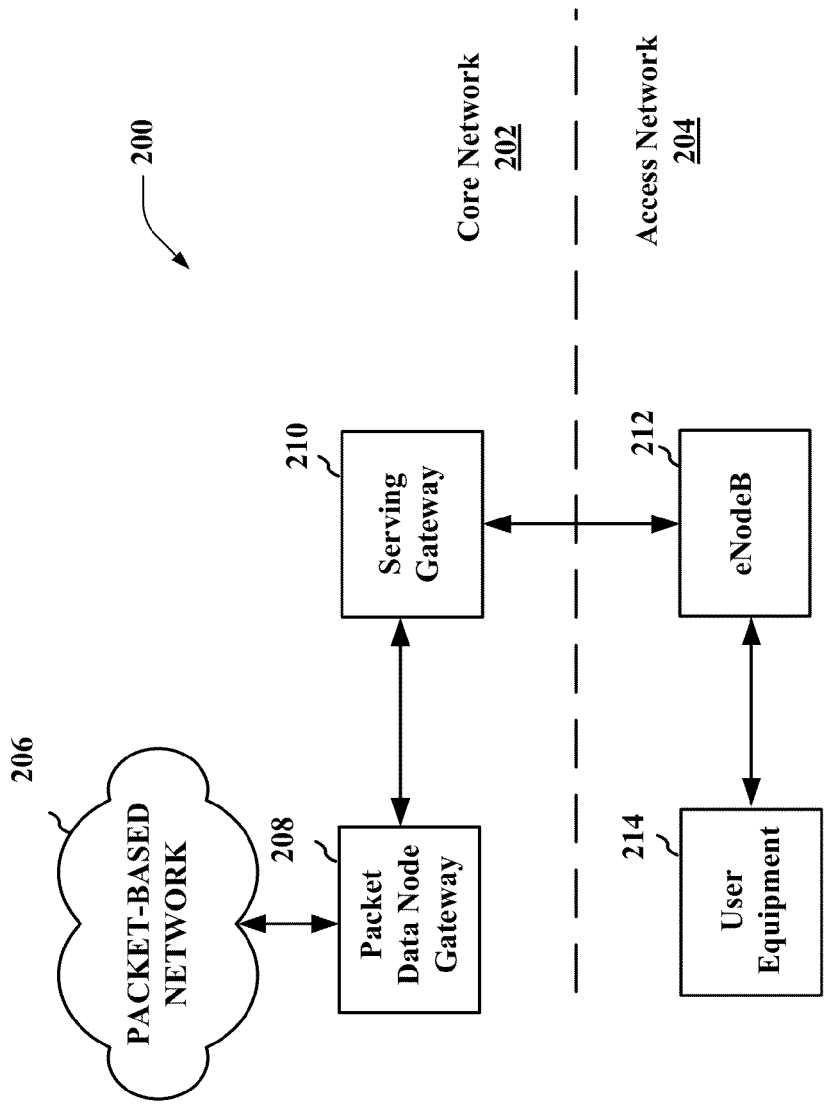
FIG. 2 is a conceptual diagram illustrating an example of a network architecture.

An example of a telecommunications system employing various apparatus will now be presented with reference to an LTE network architecture as shown in FIG. 2. The LTE network architecture 200 is shown with a core network 202 and an access network 204. In this example, the core network 202 provides packet-switched services to the access network 204, however, as those skilled in the art will readily appreciate, the various concepts presented throughout this disclosure may be extended to core networks providing circuit-switched services.

The access network 204 is shown with a single apparatus 212, which is commonly referred to as an evolved NodeB in LTE applications, but may also be referred to by those skilled in the art as a base station, a base transceiver station, a radio base station, a radio transceiver, a transceiver function, a basic service set (BSS), an extended service set (ESS), or some other suitable terminology. The eNodeB 212 provides an access point to the core network 202 for a mobile apparatus 214. Examples of a mobile apparatus include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The mobile apparatus 214 is commonly referred to as user equipment (UE) in LTE applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The core network 202 is shown with several apparatus including a packet data node (PDN) gateway 208 and a serving gateway 210. The PDN gateway 208 provides a connection for the access network 204 to a packet-based network 206. In this example, the packet-based network 206 is the Internet, but the concepts presented throughout this disclosure are not limited to Internet applications. The primary function of the PDN gateway 208 is to provide the UE 214 with network connectivity. Data packets are transferred between the PDN gateway 208 and the UE 214 through the serving gateway 210, which serves as the local mobility anchor as the UE 214 roams through the access network 204.

Figure 3:
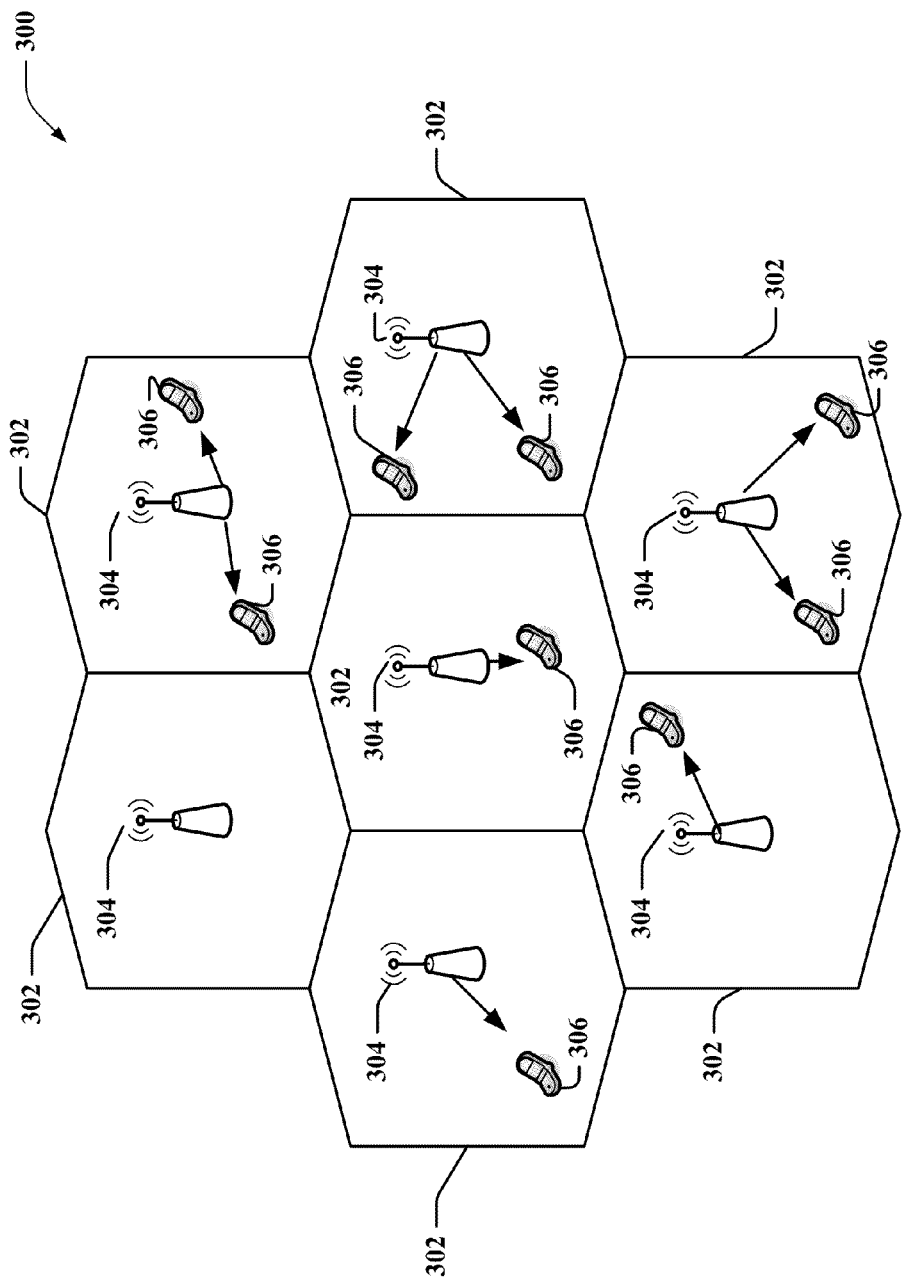
FIG. 3 is a conceptual diagram illustrating an example of an access network.

An example of an access network in an LTE network architecture will now be presented with reference to FIG. 3. In this example, the access network 300 is divided into a number of cellular regions (cells) 302. An eNodeB 304 is assigned to a cell 302 and is configured to provide an access point to a core network 202 (see FIG. 2) for all the UEs 306 in the cell 302. There is no centralized controller in this example of an access network 300, but a centralized controller may be used in alternative configurations. The eNodeB 304 is responsible for all radio related functions including radio bearer control, admission control, mobility control, scheduling, security, and connectivity to the serving gateway 210 in the core network 202 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeB 304 may have multiple antennas supporting MIMO technology. The use of MIMO technology enables the eNodeB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more the data streams destined for that UE 306. On the uplink, each UE 306 transmits a spatially precoded data stream, which enables the eNodeB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
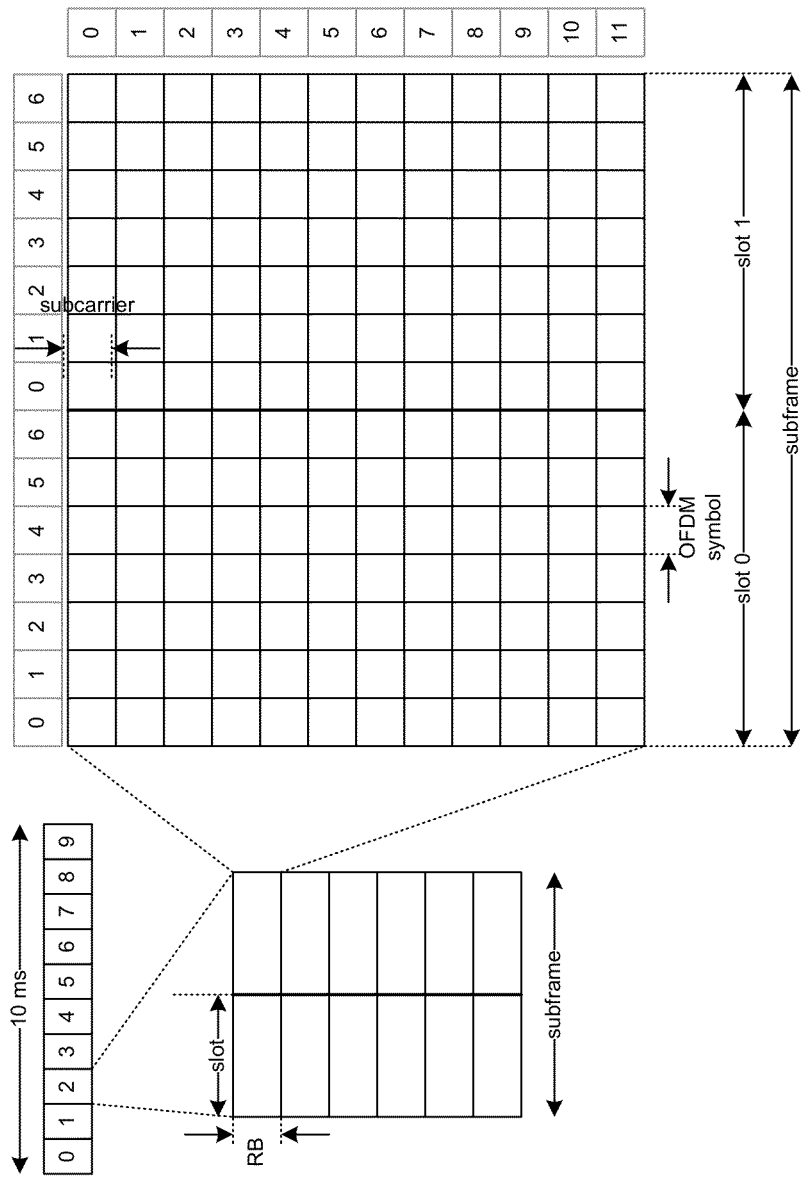
FIG. 4 is a conceptual diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. The number of bits carried by each resource element depends on the modulation scheme. Thus, the more resource blocks that a UE receives and the higher the modulation scheme, the higher the data rate for the UE.

Figure 5:
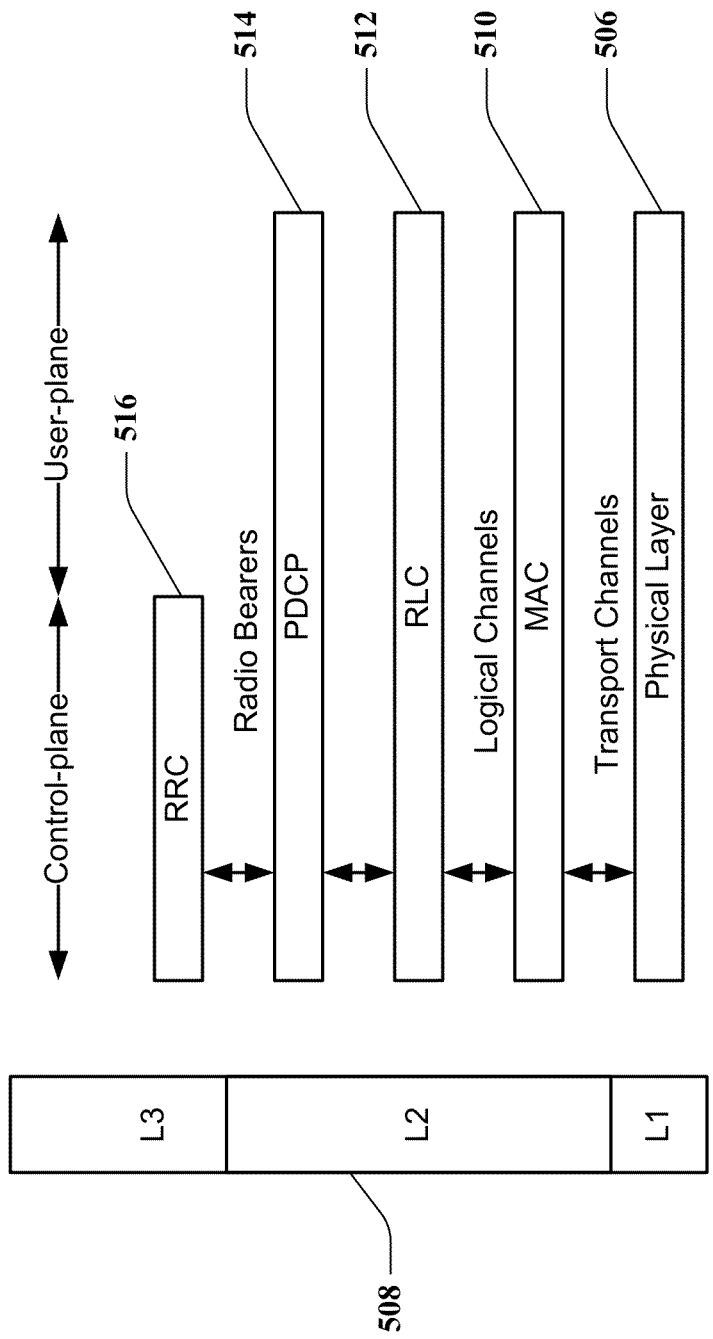
FIG. 5 is a conceptual diagram illustrating an example of a radio protocol architecture for the user and control plane.

The radio protocol architecture may take on various forms depending on the particular application. An example for an LTE system will now be presented with reference to FIG. 5. FIG. 5 is a conceptual diagram illustrating an example of the radio protocol architecture for the user and control planes.

Turning to FIG. 5, the radio protocol architecture for the UE and eNodeB is shown with three layers: Layer 1, Layer 2, and Layer 3. Layer 1 is the lowest lower and implements various physical layer signal processing functions. Layer 1 will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control pane, the radio protocol architecture for the UE and eNodeB is substantially the same for the physical layer 506 and the L2 layer 508 with the exception that there is no header compression function for the control plane. The control pane also includes a radio resource control (RRC) sublayer 516 in Layer 3. The RRC sublayer 516 is responsible for obtaining radio resources (i.e., radio bearers) and for configuring the lower layers using RRC signaling between the eNodeB and the UE.

Figure 6:
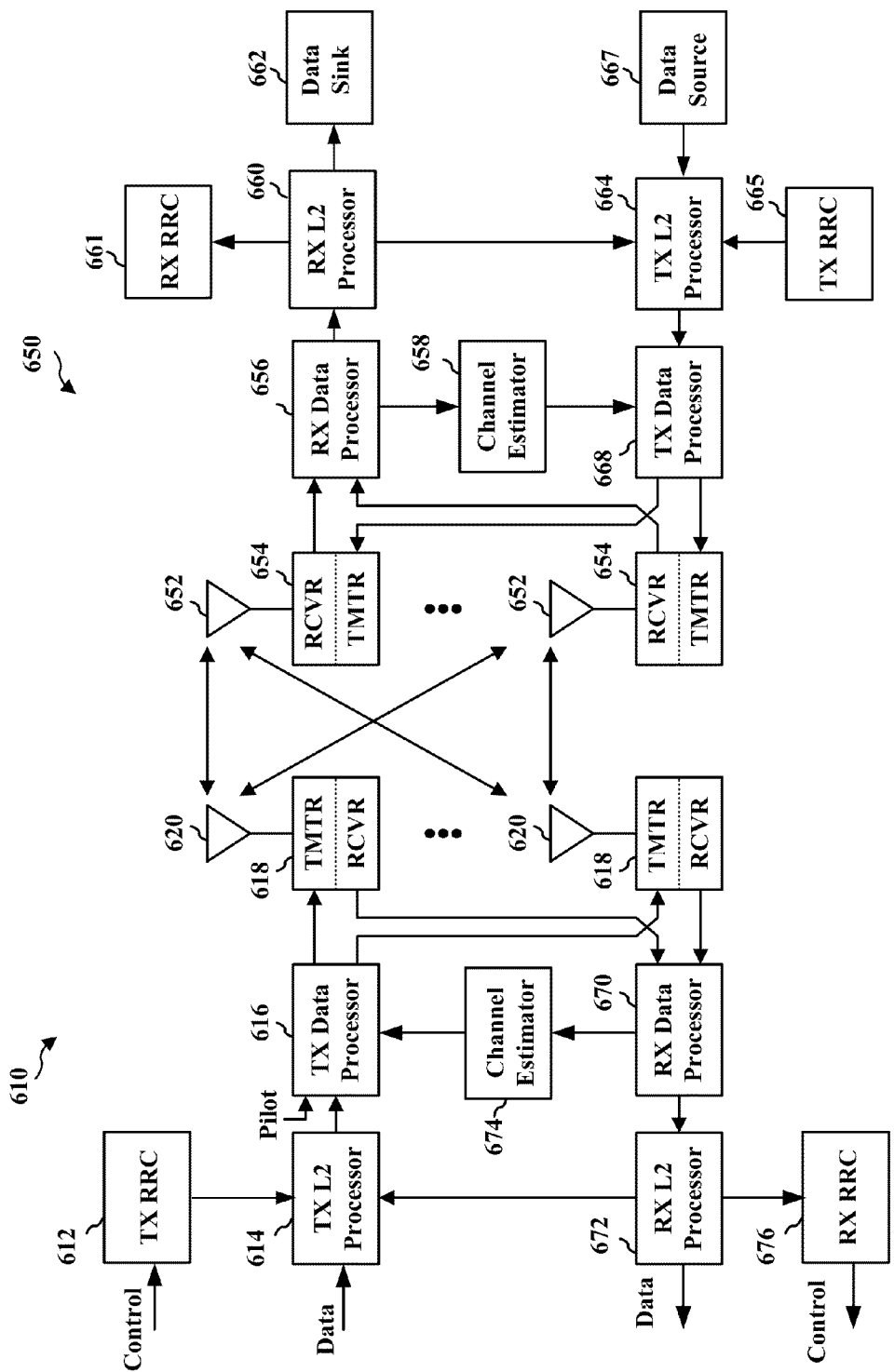
FIG. 6 is a conceptual diagram illustrating an example of an eNodeB and UE in an access network.

FIG. 6 is a block diagram of a eNodeB in communication with a UE in an access network. In the DL, upper layer packets from the core network are provided to a transmit (TX) L2 processor 614. The TX L2 processor 614 implements the functionality of the L2 layer described earlier in connection with FIG. 5. More specifically, the TX L2 processor 614 compresses the headers of the upper layer packets, ciphers the packets, segments the ciphered packets, reorders the segmented packets, multiplexes the data packets between logical and transport channels, and allocates radio resources to the UE 650 based on various priority metrics. The TX L2 processor 614 is also responsible for HARQ operations, retransmission of lost packets, and signaling to the UE 650 based on controls from the TX radio resource controller 612.

The TX data processor 616 implements various signal processing functions for the physical layer. The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) data processor 656.

The RX data processor 656 implements various signal processing functions of the physical layer. The RX data processor 656 performs spatial processing on the information to recover any spatial streams destined for the UE 650. If multiple spatial streams are destined for the UE 650, they may be combined by the RX data processor 656 into a single OFDM symbol stream. The RX data processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to a RX L2 processor 660.

The RX L2 processor 660 implements the functionality of the L2 layer described earlier in connection with FIG. 5. More specifically, the RX L2 processor 660 provides demultiplexing between transport and logical channels, reassembles the data packets into upper layer packets, deciphers the upper layer packets, decompresses the headers and processes the control signals. The upper layer packets are then provided to a data sink 662, which represents all the protocol layers above the L2 layer. The RX L2 processor 660 is also responsible for error detection using an acknowledgement (ACK) and/or negative acknowledgement (NACK) protocol to support HARQ operations. The control signals are provided to a RX radio resource controller 661.

In the UL, a data source 667 is used to provide data packets to a transmit (TX) L2 processor 664. The data source 667 represents all protocol layers above the L2 layer (L2). Similar to the functionality described in connection with the DL transmission by the eNodeB 610, the TX L2 processor 664 implements the L2 layer for the user plane and the control plane. The latter is in response to a TX radio resource controller 665. The TX data processor 668 implements the physical layer. Channel estimates derived by a channel estimator 658 from a reference signal or feedback transmitted by the eNodeB 610 may be used by the TX data processor 668 to select the appropriate coding and modulation schemes, and to facilitate spatial processing. The spatial streams generated by the TX data processor 668 are provided to different antenna 652 via separate transmitters 654TX. Each transmitter 654TX modulates an RF carrier with a respective spatial stream for transmission.

The UL transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX data processor 670. The RX data processor 670 implements the physical layer and the RX L2 processor 672 implements the L2 layer. Upper layer packets from the RX L2 processor may be provided to the core network and control signals may be provided to a RX radio resource controller 676.

Figure 7:
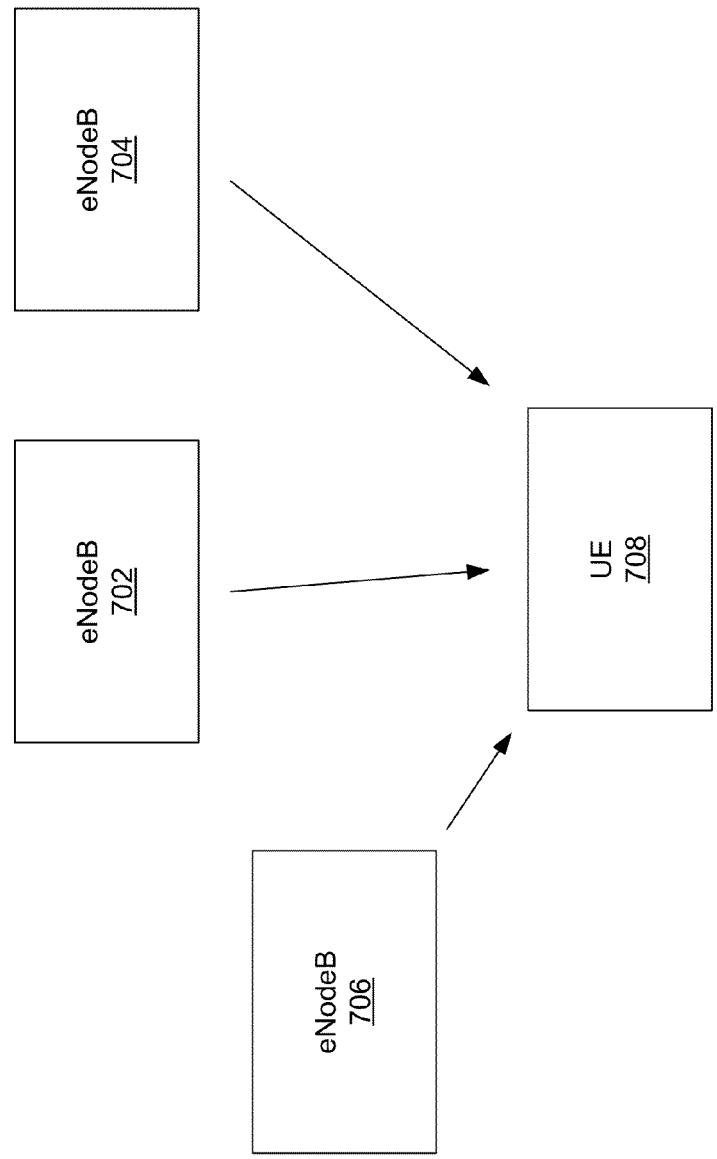
FIG. 7 is a conceptual diagram illustrating a UE receiving signals from a plurality of eNodeBs.

FIG. 7 is a conceptual diagram illustrating a UE 708 receiving signals from a plurality of eNodeBs 702, 704, 706. In some scenarios, a UE may need to connect to a weaker cell instead of the strongest cell. As an example, for range expansion, it may be beneficial to associate a UE with a weaker cell with smaller path loss even though the transmit power of that cell may be lower than the strongest cell. Furthermore, the strongest cell may be a closed subscriber group (CSG) cell and, therefore, may not be accessible to the UE.

In such scenarios, it may be beneficial for the UE to track the timing, carrier frequency, or both of the stronger cell instead of the weaker serving cell's. Conventionally, a UE's timing tracking loop (TTL) and frequency tracking loop (FTL) try to obtain serving cell timing and frequency. In certain scenarios, however, it may be beneficial that a UE tracks timing/frequency of the serving cell, timing/frequency of a dominant interferer, or combined timing/frequency of all cells, including the serving cell and all interferers. Benefits may include, for example, improved cancellation of signals from interfering cells.

As a UE tracks a single timing (be it a serving cell's timing, a strong interferer's timing, or a composite timing), there naturally exists a gap between the timing the UE is tracking (i.e., the timing of the UE with respect to the timing alignment of a frame, the subframes within the frame, and the OFDM symbols within each subframe) and the timing of each cell the UE wants to monitor. For example, referring to FIG. 7, there may be a gap between the timing the UE 708 is tracking and the timing of each of the eNodeBs 702, 704, 706.

According to certain aspects presented herein, the UE 708 may track a single system timing and/or system frequency and estimate per-cell timing or frequency offsets for each cell. The system timing and/or frequency may be derived from a single cell (e.g., with a strongest receive signal strength) or from multiple cells. As a simple example, a first cell (e.g., "cell A" with eNodeB 702) may have a frequency of 2 GHz+ 100 Hz and a second cell ("cell B" with eNodeB 704) may have a frequency of 2 GHz+200 Hz. Assuming the UE 708 sees similar received powers from the two cells, the UE may want to track 2 GHz+150 Hz, and determine the per-cell frequency error of cell A as −50 Hz (relative to the tracked frequency of 2 GHz+150 Hz) and of cell B as +50 Hz. In other words, in this example, the UE 708 is not tracking the frequency of any particular cell, but rather it is tracking an average frequency of the two cells. Similarly, for timing tracking, a UE may track timing of a single cell or "composite" timing derived from the timing of multiple cells.

The per-cell timing offset of a cell may be estimated by using signals transmitted from the cell(s), such as a cell-specific reference signal (CRS), primary synchronization signal (PSS), secondary synchronization signal (SSS), or cyclic prefix (CP). The per-cell timing offset may be estimated concurrently, assuming the UE 708 has the appropriate duplicative hardware, or the offset may be estimated sequentially. The per-cell timing offset estimates may be used to enhance the performance of the UE 708, for example, by increasing accuracy of channel estimation between the UEs and different eNodeBs. In one configuration, the tracking with the particular timing is performed by combining signals from the cells. The signals include at least one of CRS tones, a PSS, an SSS, or a cyclic prefix. In one configuration, the signals are combined according to received strengths of the signals.

As noted above, as the UE 708 tracks the carrier frequency (or frequency error relative to a particular carrier frequency) of a single cell (be it a serving cell's or a strong interferer's) or a composite frequency offset, there exists a gap between the carrier frequency the UE 708 is tracking (i.e., the carrier frequency including the carrier frequency error to which the UE is tuned) and the carrier frequency error of each cell the UE 708 wants to monitor.

As such, according to certain aspects, the UE 708 may also estimate the per-cell frequency offset of each cell. The per-cell frequency offset of a cell is the offset between the carrier frequency (or frequency error) the UE is tracking (tuned to) and the frequency error of a particular cell the UE 708 is tracking. The per-cell frequency offset of a cell may also be estimated by using signals transmitted from the cell (e.g., RS tones, PSS, SSS, cyclic prefix, etc.). The per-cell frequency offset estimates may also be used to enhance the performance of the UE 708. Furthermore, the per-cell carrier frequency error estimates may be used to track a particular carrier frequency error. In one configuration, the tracking the particular carrier frequency error is performed by combining signals from the cells. The signals include at least one of CRS tones, a PSS, an SSS, or a cyclic prefix. In one configuration, the signals are combined according to received strengths of the signals.

In some cases, what the UE 708 may be tracking (estimating) is the error or deviation of the eNB's carrier frequency from the known carrier frequency value. For example, assume the carrier frequency is 2 GHz, which is known at the UE through a cell acquisition procedure. Assume also that the oscillator of eNodeB 704 is operating at 2 GHz+100 Hz and the oscillator of eNodeB 706 is operating at 2 GHz+200 Hz. In this case, the mean carrier frequency error is 150 Hz, the carrier frequency error of the eNodeB 704 is 100 Hz, and the carrier frequency error of the eNodeB 706 is 200 Hz. Assume that the UE 708 is tracking the mean carrier frequency error of 150 Hz. As such, the frequency offset for the eNodeB 704 is 100 Hz minus 150 Hz, which is equal to −50 Hz, and the frequency offset for the eNodeB 706 is 200 Hz minus 150 Hz, which is equal to 50 Hz.

The per-cell timing offset can be used to better estimate the channel of each cell, as the per-cell timing enables the UE to accurately locate channel taps from the cell. For example, the UE 708 can set its channel tap truncation windows based on the per-cell timings. That is, the UE 708 can set a first channel tap truncation window based on the timing of the eNodeB 702, a second channel tap truncation window based on the timing of the eNodeB 704, and a third channel tap truncation window based on the timing of the eNodeB 706. For the serving cell, the improved channel estimation directly translates to improved UE performance. For an interfering cell, the improved channel estimation may translate to better interference cancellation of the cell and therefore improved UE performance. For example, if the eNodeB 702 is a serving cell for the UE 708 and the eNodeB 704 and the eNodeB 706 are interfering cells for the UE 708, the first channel tap truncation window will provide improved serving cell channel estimation. In addition, signals processed through the second and third channel tap truncation windows may lead to improved channel estimation between eNodeBs 704 and 706, which may result in better interference cancellation.

The per-cell frequency offset may also be used to better estimate the channel of each cell. For example, the UE 708 may apply a rotation (i.e., phase shift) on RS and channel estimates from a cell to help remove residual frequency error on the RS from the cell. The rotation amount may be determined based on the per-cell frequency offset estimate for the cell. For the serving cell, the improved channel estimation directly translates to improved UE performance. For an interfering cell, the improved channel estimation translates to better interference cancellation of the cell and therefore improved UE performance.

FIG. 8 illustrates example operations 800 for estimating per-cell timing offsets. The operations 800 may be performed, for example, by a UE, such as UE 708 shown in FIG. 7 to estimate per-cell timing offsets for eNodeBs 702-706.

The operations 800 begin, at 802, by estimating timing for tracking (e.g., the timing of a particular cell or a combination of a plurality of cells. As noted above, this timing may be derived from received signals (CRS, etc) from a strongest cell or by combining signals from multiple cells with appropriate averaging or weighting). At 804, per-cell timing offsets (relative to the aforementioned timing the UE is tracking) for all cells are determined. At 806, signals received from the plurality of cells are processed using one or more channel tap truncation windows set based on the timing offsets.

As described above, the timing offset for a cell generally refers to a difference between the timing for the cell and the timing a UE is tracking. According to certain aspects, a channel tap truncation window may be set for each cell based on the timing offset for that cell. According to certain aspects, a channel may be estimated from each cell through the channel tap truncation window for that cell. These estimated channels may be utilized in processing signals received from each cell.

FIG. 9 illustrates example operations 900 for estimating per-cell frequency offsets. The operations 900 may also be performed by a UE, such as UE 708 shown in FIG. 7 to estimate per-cell frequency offsets for eNodeBs 702-706.

The operations 900 begin, at 902, by estimating a frequency of a particular cell or combination of a plurality of cells. As noted above, this frequency may be derived from received signals (CRS, etc) from a strongest cell or by combining signals from multiple cells with appropriate averaging or weighting). At 904, per-cell frequency offsets (relative to the aforementioned carrier frequency the UE is tracking) for all cells are determined. At 906, signals received from the plurality of cells are processed using the per-cell frequency offsets.

In one configuration, a particular carrier frequency that is tracked may be derived based on an average/mean of the per-cell frequency error estimates. As described above, the frequency offset for a cell generally refers to a difference between the carrier frequency (or frequency error) for the cell and the particular cell being tracked.

According to certain aspects, the processing of 906 may include applying a phase shift on cell-specific reference signals from each of the cells to remove a residual frequency error on the cell-specific reference signals. The phase shift on the cell-specific reference signals from a cell may be determined as a function of the determined frequency offset for that cell.

According to certain aspects, the frequency and/or timing offset averages may be weighted, for example, according to the received signal strengths of cells participating in the averaging.

Figure 10:
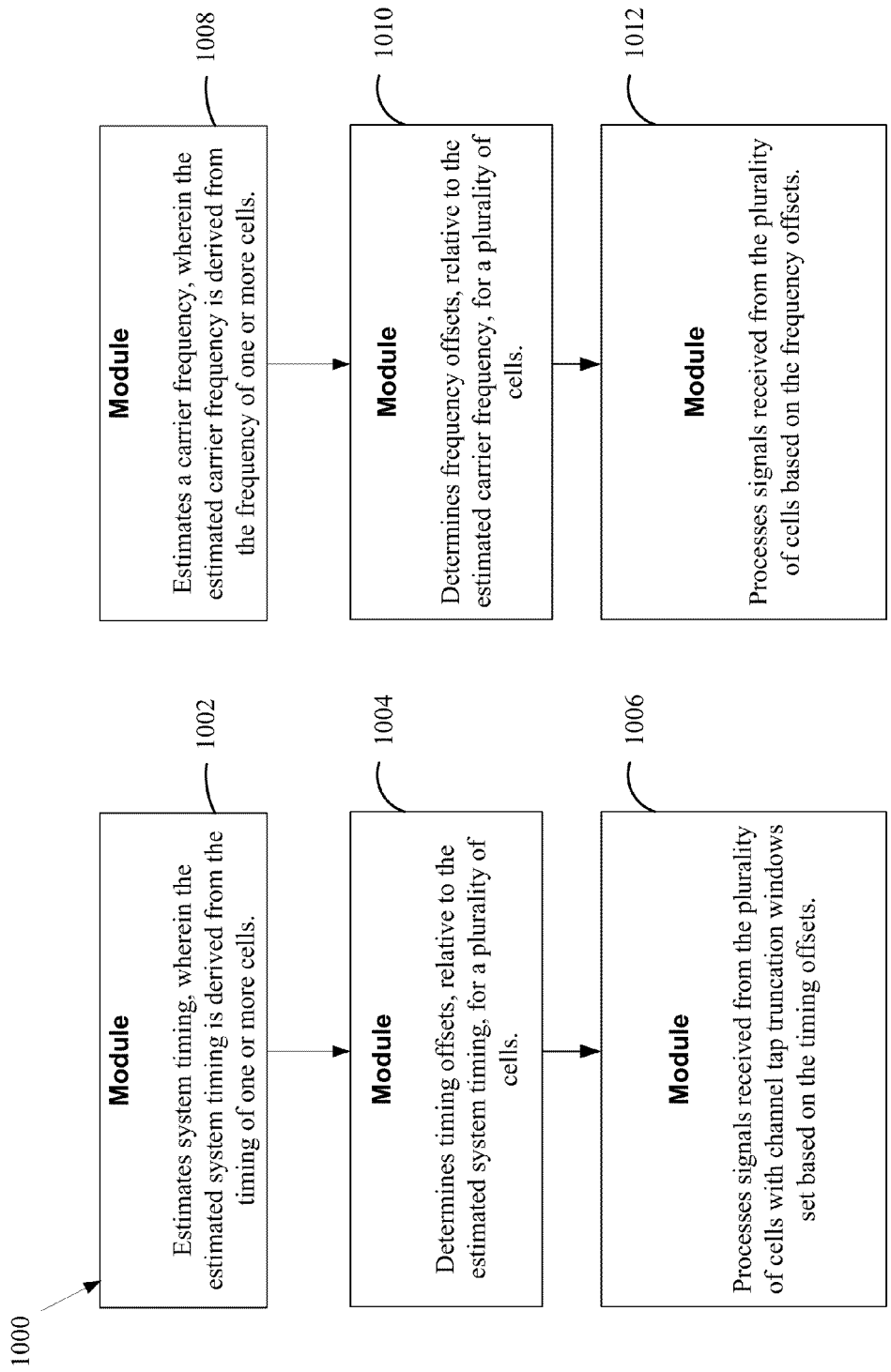
FIG. 10 is a conceptual block diagram illustrating the functionality of an exemplary apparatus.

FIG. 10 is a conceptual block diagram illustrating the functionality of an exemplary apparatus 1000. The apparatus 1000 may include a module 1002 that estimates timing of a particular cell or combination of a plurality of cells, a module 1004 that determines per-cell timing offsets, relative to the timing the UE is tracking, for all cells of the plurality of cells, and a module 1006 that processes signals received from the plurality of cells by setting one or more channel tap truncation windows based on the per-cell timing offsets.

In addition to, or as an alternative to, the modules 1002-1006, the apparatus 1000 may also include a module 1008 that determines per-cell frequency offsets, relative to the carrier frequency the UE is tracking, for all the plurality of cells, and a module 1010 that processes signals received from the plurality of cells based on the per-cell frequency offsets.

Depending on a particular configuration, an apparatus may utilize per-cell timing offsets, per-cell frequency offsets, or both. Thus, in one configuration, the apparatus 1000 may include modules 1002-1006. In another configuration, the apparatus 1000 includes modules 1008-1012. In yet another configuration, the apparatus 1000 may include modules 1002-1012.

In one configuration, the apparatus 1000 for wireless communication may include means for performing the functionality shown in FIG. 10. The means may comprise any suitable component or combination of components. According to certain aspects, the means may be implemented with the processing system 114 of FIG. 1, configured to perform the functions described herein.

In cooperative multi-point (CoMP) systems, signals intended for a UE are transmitted from multiple cells (called "CoMP transmission points") and combined on the air. In some cases, the CoMP transmission points may be transparent to the UE, meaning the UE may not know which cells correspond to its CoMP transmission points. Transparency of the CoMP transmission points may be made possible by use of dedicated UE-specific RS (UE-RS).

Figure 11:
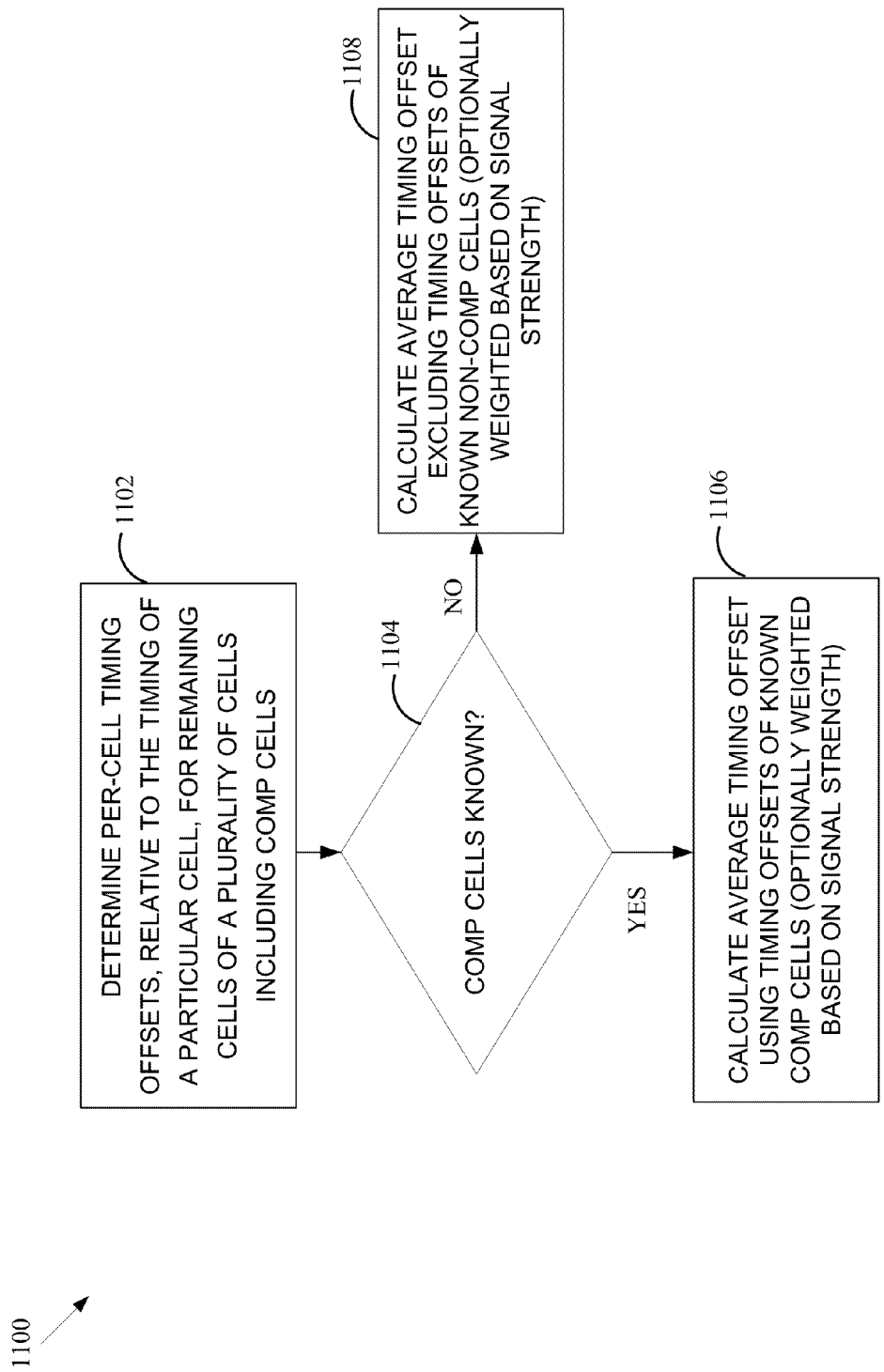
FIG. 11 is a flow chart of a method of wireless communication.

FIG. 11 illustrates example operations 1100 for utilizing timing offsets in a CoMP system. The operations begin, at 1102, by determining per-cell timing offsets, relative to the timing of a particular cell, for remaining cells of a plurality of cells including CoMP cells. For example, these per-cell timing offsets may be determined as described above, with reference to FIG. 8.

In order to accurately estimate the CoMP channel, the UE may identify the timings of cells in its CoMP transmission points. If CoMP transmission points are known to the UE, as determined at 1104, the UE may calculate an average timing offset using timing offsets of those known CoMP cells, at 1106. If CoMP transmission points are unknown to the UE, the UE may exclude timing offsets of known non-CoMP cells when calculating an average timing offset, at 1108. Known non-CoMP cells may include certain cells that are not allowed to participate in a UE's CoMP. Examples of excludable cells may include cells where the UE is barred access (e.g., CSG cells).

The UE may set its channel tap truncation window based on the determined average timing offset (calculated for known CoMP transmission points and/or by excluding known non-CoMP transmission points).

As an example, referring to FIG. 7, it may be assumed the eNodeB 702 and the eNodeB 704 are CoMP transmission points and the eNodeB 706 is not a CoMP transmission point. Assume also that the UE 708 is aware that the eNodeB 702 and the eNodeB 704 are CoMP transmission points and that the eNodeB 706 is not a CoMP transmission point. The UE 708 may estimate a timing offset for each of the cells 702, 704, 706. In addition, the UE 708 may determine a timing offset for the CoMP transmission points 702, 704 by combining signals of a subset of the cells. The subset of the cells includes cells 702, 704, as the UE 708 knows that these cells are CoMP transmission points. If the UE 708 did not know which cells are CoMP transmission points, the subset of the cells may include all the cells excluding cells known not to be CoMP transmission points. The UE 708 may set a channel tap truncation window for CoMP channel estimation based on the determined timing offset. The CoMP channel estimation is based on UE-specific reference signals from the CoMP transmission points 702, 704.

In order to accurately estimate the CoMP channel, the UE may additionally (or alternatively) identify the frequency offset of cells in its CoMP transmission points.

Figure 12:
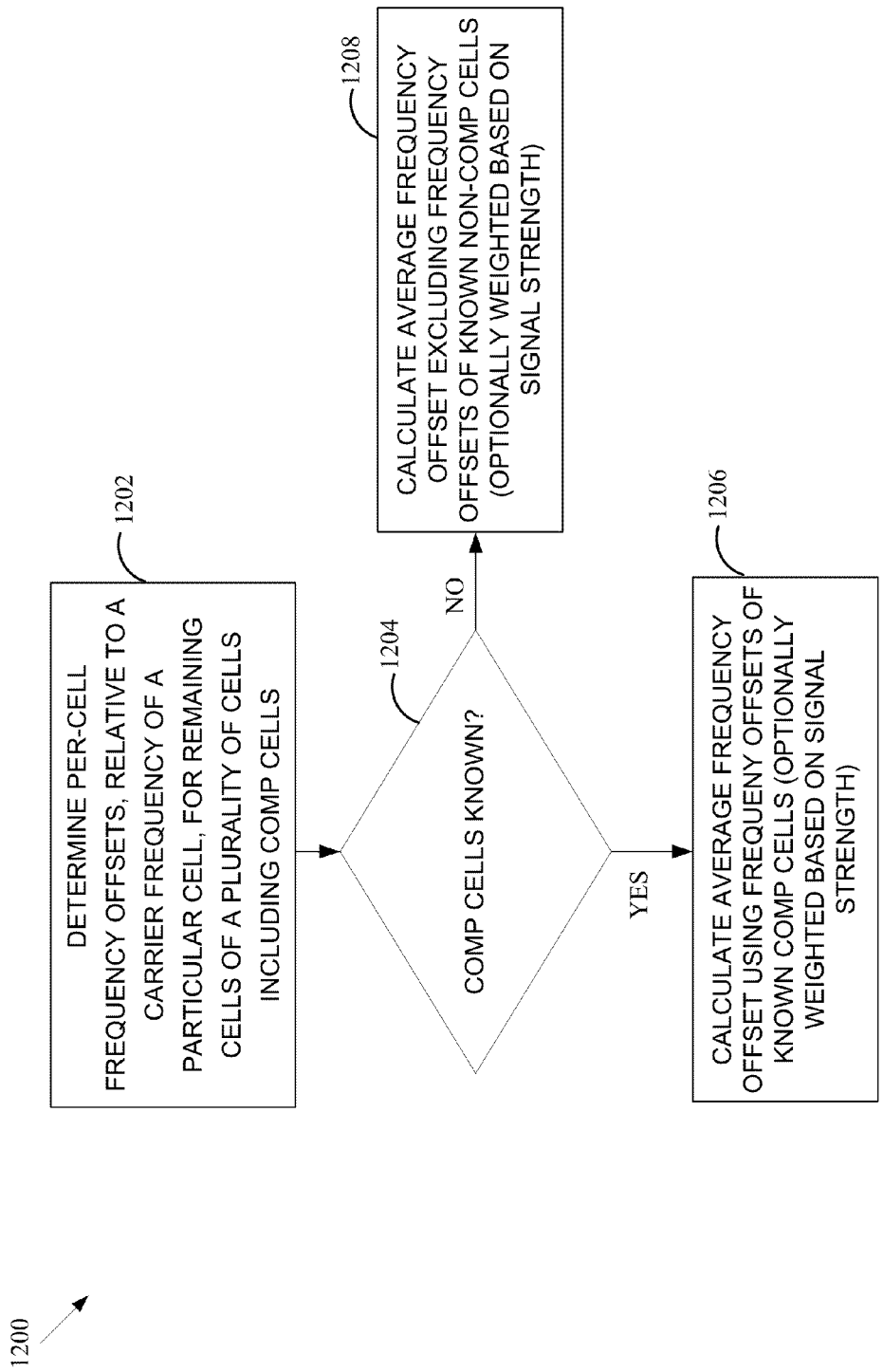
FIG. 12 is another flow chart of a method of wireless communication

FIG. 12 illustrates example operations 1200 for utilizing frequency offsets in a CoMP system. The operations begin, at 1202, by determining per-cell frequency offsets, relative to the frequency of a particular cell, for remaining cells of a plurality of cells including CoMP cells. For example, these per-cell frequency offsets may be determined as described above, with reference to FIG. 9.

In order to accurately estimate the CoMP channel, the UE may identify the frequency of cells in its CoMP transmission points. If CoMP transmission points are known to the UE, as determined at 1204, the UE may calculate an average frequency offset using frequency offsets of those known CoMP cells, at 1206. If CoMP transmission points are unknown to the UE, the UE may exclude frequency offsets of known non-CoMP cells when calculating an average frequency offset, at 1208.

The UE may use the average frequency offset to minimize the impact of frequency errors among CoMP transmission points. For example, the UE may attempt to minimize the impact of frequency errors by applying rotation on received UE-RS signals. That is, the UE may apply a phase shift on UE-specific reference signals from CoMP transmission points to minimize a residual frequency error on the UE-specific reference signals. The phase shift applied to the UE-specific reference signals may be a function of the determined average carrier frequency offset.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method of wireless communication by a user equipment (UE), comprising:
    estimating a carrier frequency, wherein the estimated carrier frequency is derived from a frequency of one or more cells;
    determining frequency offsets, relative to the estimated carrier frequency, for a plurality of the one or more cells including at least one serving cell; and
    processing signals received from the plurality of cells based on one or more of the frequency offsets, the processing including
        determining an average frequency offset from one or more of the determined frequency offsets; and
        processing signals received from all or a subset of the plurality of cells based on the average frequency offset.

2. The method of claim 1, wherein the estimating the carrier frequency is performed by using a received signal comprising at least one of a cell-specific reference signal, a primary synchronization signal, a secondary synchronization signal, or a cyclic prefix.

3. The method of claim 2, wherein the received signal comprises a signal received from a particular cell.

4. The method of claim 3, wherein the particular cell comprises a cell with a strongest received signal strength for one or more reference signals.

5. The method of claim 4, wherein the received signal comprises a combination of signals from multiple cells.

6. The method of claim 4, further comprising applying a phase shift to a cell-specific reference signal from at least one of the plurality of cells, wherein the phase shift is a function of the determined frequency offset for the at least one of the plurality of cells.

7. The method of claim 1, wherein the subset of the plurality of cells includes cells known to participate in cooperative multi-point (CoMP) transmissions to the UE.

8. The method of claim 7, wherein:
    determining the average frequency offset comprises utilizing frequency offsets for cells known to participate in CoMP transmissions.

9. The method of claim 7, wherein:
    determining the average frequency offset comprises utilizing frequency offsets for one or more cells known to not participate in CoMP transmissions.

10. The method of claim 7, wherein:
    determining the average frequency offset comprises calculating a weighted average according to received signal strengths.

11. An apparatus for wireless communication by a user equipment (UE), comprising:

means for estimating a carrier frequency, wherein the estimated carrier frequency is derived from a frequency of one or more cells;

means for determining frequency offsets, relative to the estimated carrier frequency, for a plurality of the one or more cells including at least one serving cell; and means for processing signals received from the plurality of cells based on one or more of the frequency offsets, wherein the means for processing signals determines an average frequency offset from one or more of the determined frequency offsets; and processes signals received from all or a subset of the plurality of cells based on the average frequency offset.

12. The apparatus of claim 11, wherein the means for estimating the carrier frequency utilizes a received signal comprising at least one of a cell-specific reference signal, a primary synchronization signal, a secondary synchronization signal, or a cyclic prefix.

13. The apparatus of claim 12, wherein the received signal comprises a signal received from a particular cell.

14. The apparatus of claim 13, wherein the particular cell comprises a cell with a strongest received signal strength for one or more reference signals.

15. The apparatus of claim 14, wherein the received signal comprises a combination of signals from multiple cells.

16. The apparatus of claim 14, further comprising means for applying a phase shift to a cell-specific reference signal from at least one of the plurality of cells, wherein the phase shift is a function of the determined frequency offset for the at least one of the plurality of cells.

17. The apparatus of claim 11, wherein the means for processing signals includes a means for determining the average frequency offset; and the subset of the plurality of cells includes cells known to participate in cooperative multi-point (CoMP) transmissions to the UE.

18. The apparatus of claim 17, wherein:

the means for determining the average frequency offset comprises means for utilizing frequency offsets for cells known to participate in CoMP transmissions.

19. The apparatus of claim 17, wherein:

the means for determining the average frequency offset comprises means for utilizing frequency offsets for one or more cells known to not participate in CoMP transmissions.

20. The apparatus of claim 17, wherein:

the means for determining the average frequency offset comprises means for calculating a weighted average according to received signal strengths.

21. An apparatus for wireless communications, comprising:

at least one processor configured to, estimate a carrier frequency, wherein the estimated carrier frequency is derived from a frequency of one or more cells;

determine frequency offsets, relative to the estimated carrier frequency, for a plurality of the one or more cells including at least one serving cell, and process signals received from the plurality of cells based on one or more of the frequency offsets, the processing including determining an average frequency offset from one or more of the determined frequency offsets; and processing signals received from all or a subset of the plurality of cells based on the average frequency offset; and a memory coupled with the at least one processor.

22. A computer program product comprising a non-transitory computer-readable storage medium having a set of instructions stored thereon, executable by a processor for:

estimating a carrier frequency, wherein the estimated carrier frequency is derived from a frequency of one or more cells;

determining frequency offsets, relative to the estimated carrier frequency, for a plurality of the one or more cells including at least one serving cell; and processing signals received from the plurality of cells based on one or more of the frequency offsets, the processing including determining an average frequency offset from one or more of the determined frequency offsets; and processing signals received from all or a subset of the plurality of cells based on the average frequency offset.

* * * * *